US012196507B1

(12) United States Patent
Hartman

(10) Patent No.: US 12,196,507 B1
(45) Date of Patent: Jan. 14, 2025

(54) HELICAL ELECTROMAGNETIC COUNTER RECOIL MECHANISM

(71) Applicant: Honeywell Federal Manufacturing & Technologies, LLC, Kansas City, MO (US)

(72) Inventor: Seth D. Hartman, Belton, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 605 days.

(21) Appl. No.: 17/361,407

(22) Filed: Jun. 29, 2021

(51) Int. Cl.
*F41A 1/08* (2006.01)
*H01F 7/08* (2006.01)

(52) U.S. Cl.
CPC ................ *F41A 1/08* (2013.01); *H01F 7/081* (2013.01)

(58) Field of Classification Search
CPC ..................................... F41A 1/08; F41A 1/10
See application file for complete search history.

(56) References Cited

U.S. PATENT DOCUMENTS

| | | | | | |
|---|---|---|---|---|---|
| 3,296,928 | A * | 1/1967 | Lubbers | F41A 33/00 | 102/444 |
| 4,369,759 | A * | 1/1983 | Gerstenberger | F41A 3/78 | 124/68 |
| 4,527,457 | A * | 7/1985 | Fikse | F41B 6/006 | 318/135 |
| 5,074,189 | A * | 12/1991 | Kurtz | F41A 19/61 | 89/135 |
| 6,694,856 | B1 * | 2/2004 | Chen | F16F 13/007 | 89/43.01 |
| 8,686,576 | B1 * | 4/2014 | Smith | F03G 7/08 | 290/1 R |
| 10,823,523 | B1 * | 11/2020 | Wynes | F41A 25/04 | |
| 10,976,129 | B1 * | 4/2021 | Timpson | F41B 6/003 | |
| 2012/0137870 | A1 * | 6/2012 | Lindsay | F41A 1/10 | 42/1.06 |
| 2015/0226507 | A1 * | 8/2015 | Palmer | F41A 1/08 | 89/1.703 |
| 2017/0343314 | A1 * | 11/2017 | Hartman | F41B 6/003 | |
| 2021/0025669 | A1 * | 1/2021 | Griffin | F41C 23/06 | |
| 2021/0102768 | A1 * | 4/2021 | Perez | F41A 3/84 | |
| 2021/0183555 | A1 * | 6/2021 | Hartman | H02K 5/167 | |
| 2022/0065564 | A1 * | 3/2022 | Kirstein | F41A 3/46 | |

* cited by examiner

*Primary Examiner* — Derrick R Morgan
(74) *Attorney, Agent, or Firm* — Hovey Williams LLP

(57) ABSTRACT

An artillery configured to propel a projectile, the artillery comprising a firing mechanism, a barrel, and a helical electromagnetic recoil mechanism. The firing mechanism fires the projectile in a first direction toward a target. The barrel has an open-ended bore that guides the projectile in the first direction. The helical electromagnetic counter recoil mechanism includes an electrical energy source, a stator, and a helical electromagnetic armature. The electrical energy source provides electrical energy when the firing mechanism fires the projectile. The stator and armature generate an electromagnetic force via the electrical energy. The helical electromagnetic armature moves in a second direction opposite the first direction via the electromagnetic force when the firing mechanism fires the projectile in the first direction to minimize recoil of the artillery.

8 Claims, 2 Drawing Sheets

HELICAL ELECTROMAGNETIC COUNTER RECOIL MECHANISM

GOVERNMENT INTERESTS

This invention was made with Government support under Contract No.: DE-NA-0002839 awarded by the United States Department of Energy/National Nuclear Security Administration. The Government has certain rights in the invention.

BACKGROUND

Firing large projectiles induces significant recoil to artilleries, which can affect accuracy and can damage artillery components and structures. Gas piston counter recoil mechanisms are limited by fluid dynamics and have a slight delay, which results in some unmitigated recoil. Gas piston counter recoil mechanisms also have a center of mass offset from the projectile's firing axis, which causes unmitigated pitching. Recoilless rifles expel exhaust to reduce recoil, but they cannot be used in tanks and other situations.

SUMMARY

Embodiments of the invention solve the above-mentioned problems and other problems and provide a distinct advancement in the art of projectile propulsion recoil mitigation. More particularly, the invention provides a projectile propulsion device including a helical electromagnetic counter recoil mechanism that converts stored electrical energy to kinetic energy to counter recoil.

An embodiment of the invention is an artillery broadly comprising a base, a firing mechanism, a barrel, and a helical electromagnetic counter recoil mechanism having an external configuration. The artillery may be a tank gun, an airplane gun, a battleship gun, or the like. Other embodiments may encompass projectile propulsion devices more generally such as an electromagnetic launcher, a gas gun, a machine gun, or the like.

The base supports or houses the firing mechanism and barrel and may include a carriage, a gun mount, a firing platform, an elevator, and the like. The base may be maneuverable about a vertical axis (azimuth) and may be configured to pitch the barrel about a horizontal axis (altitude).

The firing mechanism activates an explosive charge of a projectile. The firing mechanism may include a firing pin, a firing spring, a trigger, electrical or mechanical actuators, or the like.

The barrel extends forward from the firing mechanism and forms an open-ended bore. The barrel is configured to guide the projectile out of the open end of the bore towards a target. The barrel may include rifling, muzzle brakes, propellant gas ports, and the like.

The helical electromagnetic counter recoil mechanism includes an electrical energy source, a positive rail, a negative rail, a number of brushes, a stator, and a helical electromagnetic armature. The helical electromagnetic counter recoil mechanism at least partially encircles the barrel so as to be external relative to the barrel.

The electrical energy source provides electrical energy to at least one of the stator and helical electromagnetic armature. The electrical energy source may be a battery, a pulse-forming network (PFN), a capacitor, or other electrical energy sources.

The positive rail electrically connects the stator to the electrical energy source via one of the brushes. Similarly, the negative rail electrically connects the helical electromagnetic armature to the electrical energy source via another one of the brushes.

The stator includes helical coils and is stationary relative to the helical electromagnetic armature. The stator may be longitudinally aligned with the barrel. The stator may also encircle at least a portion of the barrel for more compact construction. The stator is electrically connected to the positive rail via one of the brushes and to the helical electromagnetic armature via another one of the brushes.

The helical electromagnetic armature includes helical coils and is configured to longitudinally translate relative to the stator. The helical electromagnetic armature may encircle at least a portion of the stator and may encircle at least a portion of the barrel. The helical electromagnetic armature is electrically connected to the stator via one of the brushes and to the negative rail via one of the brushes.

In use, the artillery receives a reaction force realized in the form of recoil due to rapid forward acceleration of the projectile when the projectile is fired. The recoil is minimized or eliminated by the helical electromagnetic counter recoil mechanism. Specifically, the electrical energy source provides electrical energy in the form of electrical current to the stator and helical electromagnetic armature. Current passing through the coils of the stator and/or the coils of the helical electromagnetic armature creates an electromagnetic force that moves the helical electromagnetic armature in a second direction opposite the first direction at substantially the same time the projectile is propelled in the first direction. The artillery receives a reaction force from the helical electromagnetic armature that counters the reaction force or recoil imparted on the artillery by the projectile. The reaction force from the helical electromagnetic armature may provide the reaction force via electrical energy from the electrical energy source when the firing mechanism initiates movement of the projectile. To that point, a beginning of this reaction may precede, start simultaneously with, or follow the initiation of movement of the projectile.

Another embodiment of the invention is an artillery broadly comprising a base, a firing mechanism, a guide rail, and a helical electromagnetic counter recoil mechanism having an internal configuration. The artillery may be configured to fire an external projectile such as a ring projectile. Other embodiments may encompass projectile propulsion devices more generally such as an electromagnetic launcher, a gas gun, a machine gun, or the like.

The base supports or houses the firing mechanism and guide rail and may include a carriage, a gun mount, a firing platform, an elevator, and the like. The base may be maneuverable about a vertical axis (azimuth) and may be configured to pitch the guide rail about a horizontal axis (altitude).

The firing mechanism activates an explosive charge of projectile and may be positioned aft of the guide rail. The firing mechanism may include a firing pin, a firing spring, a trigger, electrical or mechanical actuators, or the like.

The guide rail extends forward from the firing mechanism and includes a central chamber configured to house the helical electromagnetic counter recoil mechanism. The guide rail is configured to be encircled by the projectile and to be aimed at a target. The guide rail may include rifling, muzzle brakes, propellant gas ports, and the like.

The helical electromagnetic counter recoil mechanism is at least partially positioned in the central chamber and broadly comprises an electrical energy source, a positive rail, a negative rail, a number of brushes, a stator, and a helical electromagnetic armature. The helical electromagnetic counter recoil mechanism is at least partially encircled by the guide rail.

The electrical energy source provides electrical energy to at least one of the stator and helical electromagnetic armature when the projectile is fired. The electrical energy source may be a battery, a capacitor, or other electrical energy sources.

The positive rail electrically connects the stator to the electrical energy source via one of the brushes. Similarly, the negative rail electrically connects the helical electromagnetic armature to the electrical energy source via another one of the brushes. The stator includes helical coils and is stationary relative to the helical electromagnetic armature. The stator may be longitudinally aligned with the guide rail and encircles the helical electromagnetic armature. The stator may also be encircled by at least a portion of the guide rail for more compact construction. The stator is electrically connected to the positive rail via one of the brushes and to the helical electromagnetic armature via another one of the brushes.

The helical electromagnetic armature includes helical coils and is configured to longitudinally translate relative to the stator. The helical electromagnetic armature may be encircled by at least a portion of the stator and at least a portion of the guide rail. The helical electromagnetic armature is electrically connected to the stator via one of the brushes and to the negative rail via another one of the brushes.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
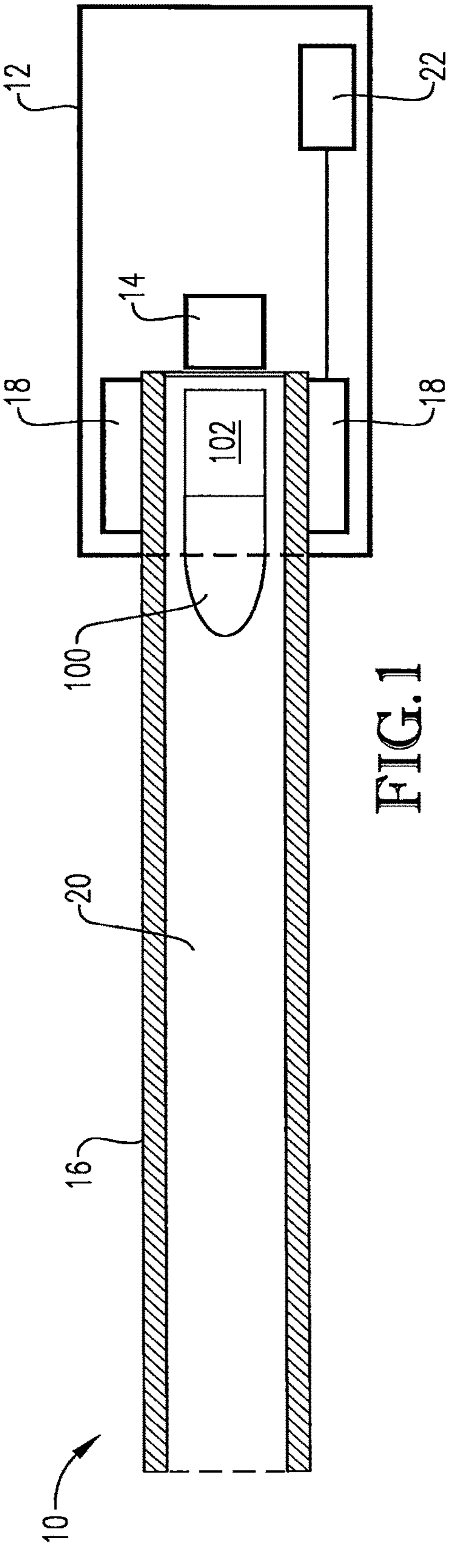
FIG. 1 is a partial cutaway elevation view of an artillery constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
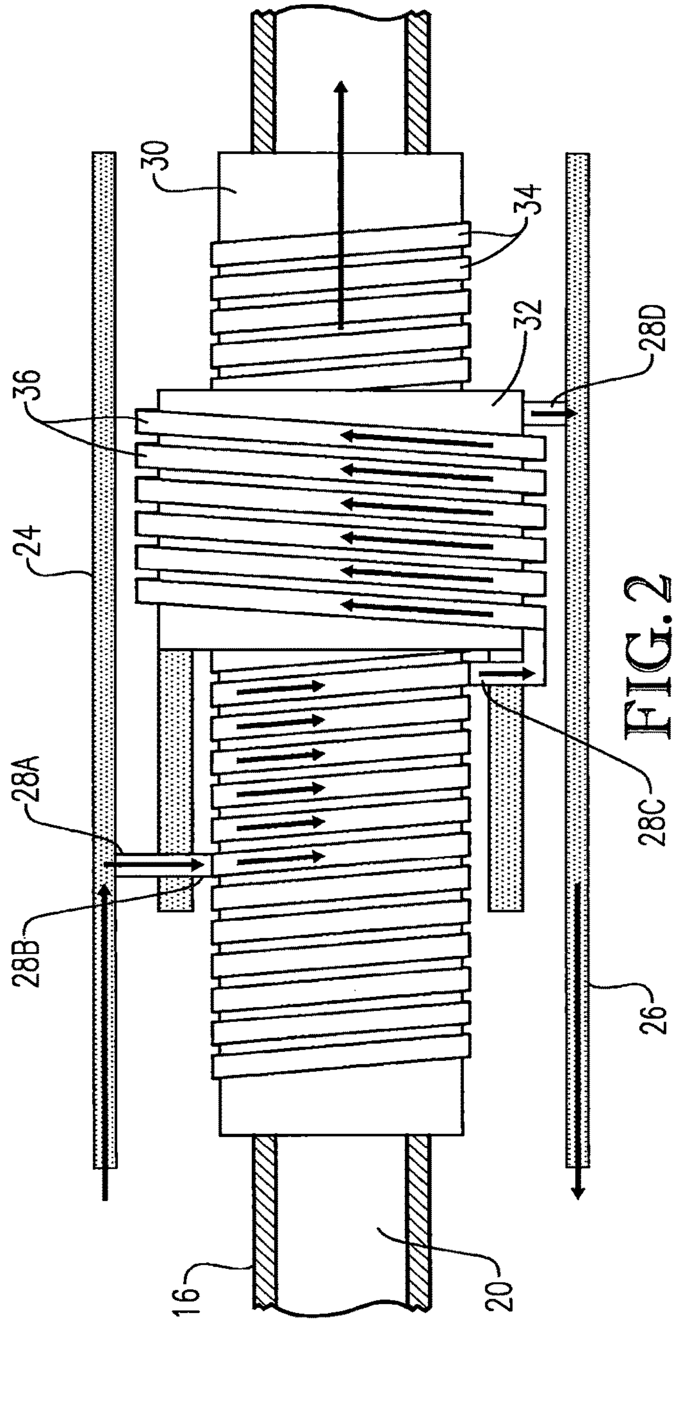
FIG. 2 is an enlarged cutaway elevation view of a helical electromagnetic counter recoil mechanism of the artillery of FIG. 1.

Turning to FIGS. 1 and 2, a projectile propulsion device 10 constructed in accordance with an embodiment of the invention is illustrated. The projectile propulsion device 10 broadly comprises a base 12, a firing mechanism 14, a barrel 16, and a helical electromagnetic counter recoil mechanism 18. The projectile propulsion device 10 may be configured to fire an internal projectile 100. The projectile propulsion device 10 may be a tank gun, an airplane gun; a battleship gun, or the like.

The base 12 supports or houses the firing mechanism 14 and barrel 16 and may include a carriage, a gun mount, a firing platform, an elevator, and the like. The base 12 may be maneuverable about a vertical axis (azimuth) and may be configured to pitch the barrel 16 about a horizontal axis (altitude).

The firing mechanism 14 may be aft of the barrel 16 and activates an explosive charge 102 of the projectile 100. The firing mechanism 14 may include a firing pin, a firing spring, a trigger, electrical or mechanical actuators, or the like.

The barrel 16 extends forward from the firing mechanism 14 and forms an open-ended bore 20. The barrel 16 is configured to guide the projectile 100 out of the open end of the bore 20 towards a target. The barrel 16 may include rifling, muzzle brakes, propellant gas ports, and the like.

The helical electromagnetic counter recoil mechanism 18 broadly comprises an electrical energy source 22, a positive rail 24, a negative rail 26, a plurality of brushes 28A-D, a stator 30, and a helical electromagnetic armature 32. The helical electromagnetic counter recoil mechanism 18 at least partially encircles the barrel 16 so as to be external relative to the barrel. That is, the helical electromagnetic counter recoil mechanism 18 may be considered to have an "external" configuration. The helical electromagnetic counter recoil mechanism 18 may have a center of mass coaxially aligned with a center of mass of the barrel 16.

The electrical energy source 22 provides electrical energy to at least one of the stator 30 and helical electromagnetic armature 32 via the positive rail 24, negative rail 26, and brushes 28A-D when the firing mechanism 14 triggers the explosive charge 102 of the projectile 100. The electrical energy source 22 may be a battery, a pulse-forming network (PFN), a capacitor, or other electrical energy sources.

The positive rail 24 is an electrical conduit electrically connecting the stator 30 to the electrical energy source 22 via brushes 28A,B. To that end, the positive rail 24 may extend parallel to longitudinal axes of the stator 30 and helical electromagnetic armature 32 and the negative rail 26.

The negative rail 26 is an electrical conduit electrically connecting the helical electromagnetic armature 32 to the electrical energy source 22 via the brush 28D. To that end, the negative rail 26 may extend parallel to the longitudinal axes of the stator 30 and helical electromagnetic armature 32 and the positive rail 24.

The brushes 28A-D electrically connect the positive rail 24, stator 30, helical electromagnetic armature 32, and negative rail 26 together while maintaining translatable freedom therebetween. Specifically, brush 28A is configured to slideably engage the positive rail 24. Brush 28B is configured to slideably engage helical coils of the stator 30. Brush 28C is connected to helical coils of the helical electromagnetic armature 32 and is configured to slideably engage helical coils of the stator 30. Brush 28D is connected to the helical coils of the helical electromagnetic armature 32 opposite brush 28C and is configured to slideably engage negative rail 26.

The stator 30 includes helical coils 34 and is stationary relative to the helical electromagnetic armature 32. The stator 30 may be longitudinally aligned with the barrel 16. The stator 30 may also encircle at least a portion of the barrel 16 for more compact construction. The stator 30 is electrically connected to the positive rail 24 via brushes 28A, B and to the helical electromagnetic armature 32 via brush 28C.

The helical electromagnetic armature 32 includes helical coils 36 and is configured to longitudinally translate relative to the stator 30. The helical electromagnetic armature 32 may encircle at least a portion of the stator 30 and may encircle at least a portion of the barrel 16. The helical electromagnetic armature 32 is electrically connected to the stator 30 via brush 28C and to the negative rail 26 via brush 28D. The helical electromagnetic armature 32 may have a mass larger than a mass of the projectile 100 to minimize travel distance of the helical electromagnetic armature 32. The helical electromagnetic armature 32 may be configured to be reset to an initial position after the projectile propulsion device 10 has fired.

The above-described helical electromagnetic counter recoil mechanism 18 includes brush connections and a stator coil and armature coil configuration for channeling electricity through the stator 30 and the helical electromagnetic armature 32. In this case, the stator 30 and helical electromagnetic armature 32 may impart an electromagnetic force on each other. Other helical electromagnetic configurations may also be used. For example, the helical electromagnetic counter recoil mechanism 18 may be configured so that electricity is channeled only through the stator or only through the armature. Other configurations such as separate electrical circuits for the stator 30 and helical electromagnetic armature 32 may be used.

Use of the projectile propulsion device 10 will now be described in more detail. The projectile 100 may be loaded in the barrel 16 near an aft end of the bore 20 (e.g., in a loading chamber). The barrel 16 may then be aimed at a target or in the initial desired trajectory of the projectile 100.

The projectile 100 may then be fired at or toward the target. Specifically, the firing mechanism 14 may engage the explosive charge 102. The explosive charge 102 may then detonate, in turn propelling the projectile 100 in a first direction (i.e., out the open end of the barrel 16). Due to rapid forward acceleration of the projectile 100, the projectile propulsion device 10 (or more specifically, the base 12 and barrel 16) receives a reaction force realized in the form of recoil, which is minimized or eliminated by the helical electromagnetic counter recoil mechanism 18 as described below.

Specifically, the electrical energy source 22 may provide electrical energy in the form of electrical current to the stator 30 and helical electromagnetic armature 32 via a circuit path routed through the positive rail 24, brushes 28A-D, and negative rail 26. Current passing through the coils 34 of the stator 30 and/or the coils 36 of the helical electromagnetic armature 32 create an electromagnetic force that moves the helical electromagnetic armature 32 in a second direction opposite the first direction at substantially the same time the projectile 100 is propelled in the first direction. The projectile propulsion device 10 receives a reaction force from the helical electromagnetic armature 32. In this way, the reaction force from the helical electromagnetic armature 32 counters the reaction force or recoil imparted on the projectile propulsion device 10 by the projectile 100.

The helical electromagnetic counter recoil mechanism 18 may then be reset. This may be done manually or via an application of reverse current or a reset mechanism.

The above-described projectile propulsion device 10 provides several advantages. For example, the helical electromagnetic counter recoil mechanism 18 minimizes or eliminates recoil from firing projectiles. The helical electromagnetic armature 32 may be coaxially aligned with the barrel 16 and bore 20 or may have a center of mass aligned with a center of mass of the projectile 100 so that a moment or rotational force is not imparted on the projectile propulsion device 10. Aspects of the helical electromagnetic counter recoil mechanism 18 can be easily adjusted to optimize performance. For example, the amount of current or a current profile can be changed via electronic circuitry, computer control, or the like to precisely control movement of the helical electromagnetic armature 32. In this way, the exact amount of force over time exerted by firing the projectile can be countered to eliminate any impulse peak, delayed reaction, reverberation, secondary forces, natural frequencies, variations in charge power (e.g., imperfect munitions), different projectile gauges and powers, and the like. To that end, the helical electromagnetic armature 32 can even reverse direction during recoil mitigation. The helical electromagnetic counter recoil mechanism 18 may at least partially encircle the barrel 16, which may reduce size of the projectile propulsion device 10.

Figure 3:
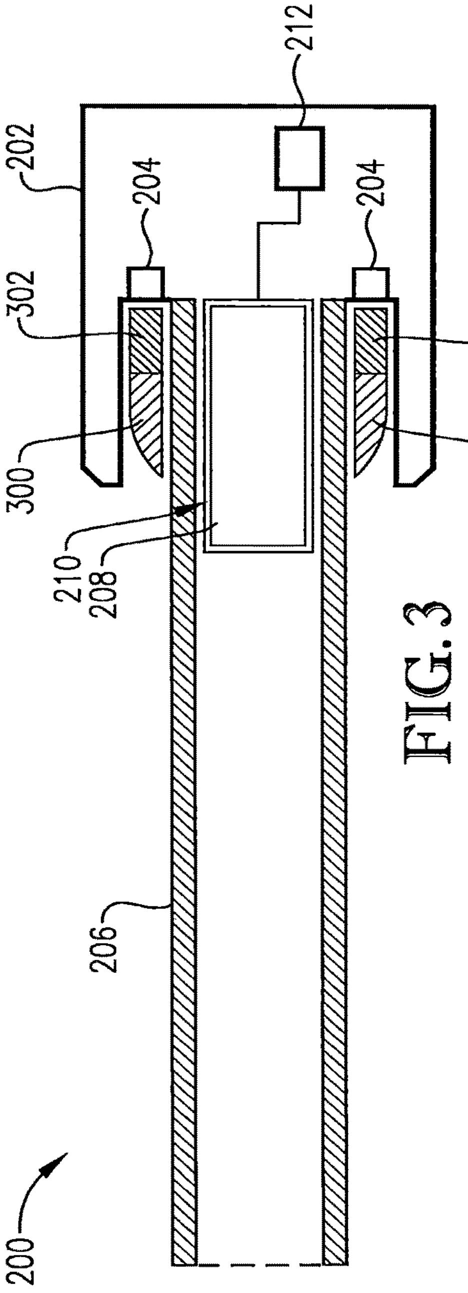
FIG. 3 is a partial cutaway elevation view of an artillery constructed in accordance with another embodiment of the invention.
Figure 4:
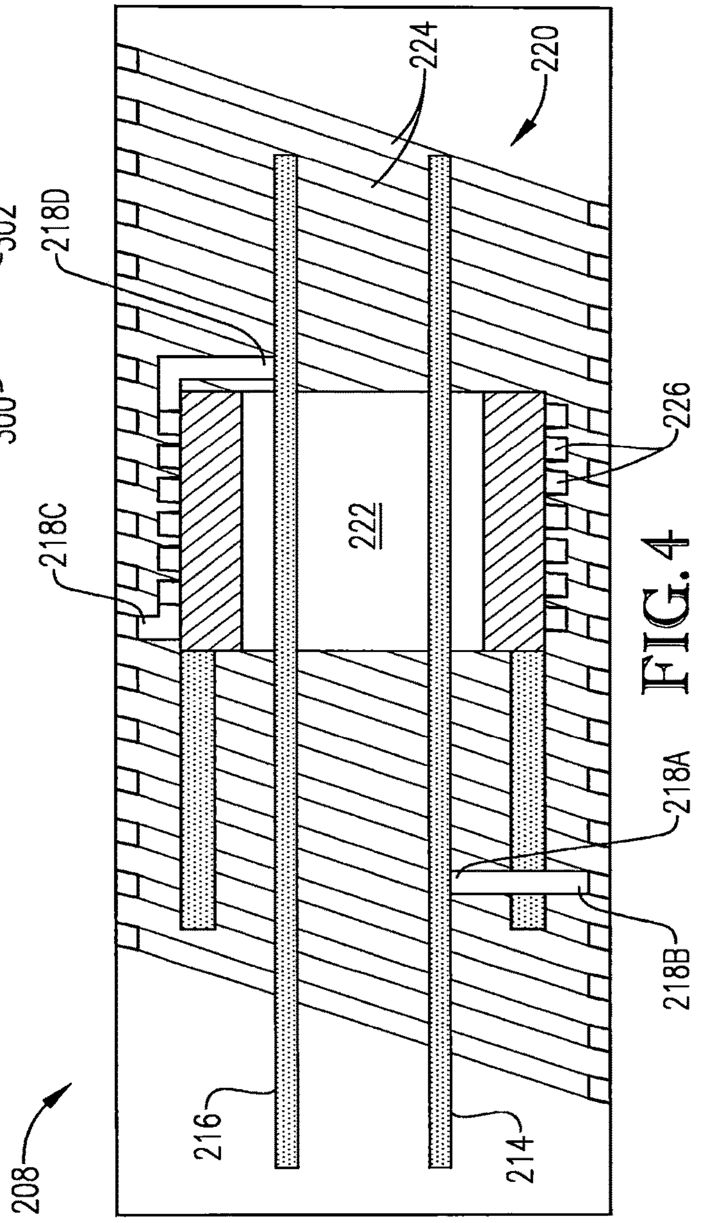
FIG. 4 an enlarged cutaway elevation view of a helical electromagnetic counter recoil mechanism of the artillery of FIG. 3.

Turning to FIGS. 3 and 4, a projectile propulsion device 200 constructed in accordance with another embodiment of the invention is illustrated. The projectile propulsion device 200 broadly comprises a base 202, a firing mechanism 204, a guide rail 206, and a helical electromagnetic counter recoil mechanism 208. The projectile propulsion device 200 may be configured to fire an external projectile. To that end, a ring projectile 300 is shown, but other projectiles with female orientation may be used.

The base 202 supports or houses the firing mechanism 204 and guide rail 206 and may include a carriage, a gun mount, a firing platform, an elevator, and the like. The base 202 may be maneuverable about a vertical axis (azimuth) and may be configured to pitch the guide rail 206 about a horizontal axis (altitude).

The firing mechanism 204 activates an explosive charge 302 of projectile 300 and may be positioned aft of the guide rail 206. The firing mechanism 204 may include a firing pin, a firing spring, a trigger, electrical or mechanical actuators, or the like.

The guide rail 206 extends forward from the firing mechanism 204 and includes a central chamber 210 configured to house the helical electromagnetic counter recoil mechanism 208. Alternatively, the central chamber 210 may be aft of the guide rail 206 in the base 202. The guide rail 206 is configured to be encircled by the projectile 300 and to be aimed at a target (or directed to axially coincide with an initial trajectory of the projectile 300) to guide the projectile 300 towards the target. The guide rail 206 may include rifling, muzzle brakes, propellant gas ports, and the like.

The helical electromagnetic counter recoil mechanism 208 is at least partially positioned in the central chamber 210 and broadly comprises an electrical energy source 212, a positive rail 214, a negative rail 216, a plurality of brushes 218A-D, a stator 220, and a helical electromagnetic armature 222. The helical electromagnetic counter recoil mechanism 208 is at least partially encircled by the guide rail 206. That is, the helical electromagnetic counter recoil mechanism 18 may be considered to have an "internal" configuration. The helical electromagnetic counter recoil mechanism 18 may have a center of mass coaxially aligned with a center of mass of the guide rail 206.

The electrical energy source 212 provides electrical energy to at least one of the stator 220 and helical electromagnetic armature 222 via the positive rail 214, negative rail 216, and brushes 218A-D when the firing mechanism 204 triggers the explosive charge 302 of the projectile 300. The electrical energy source 212 may be a battery, a pulse-forming network (PFN), a capacitor, or other electrical energy sources.

The positive rail 214 is an electrical conduit electrically connecting the stator 220 to the electrical energy source 212 via brushes 218A,B. To that end, the positive rail 214 may extend parallel to longitudinal axes of the stator 220 and helical electromagnetic armature 222 and the negative rail 216.

The negative rail 216 is an electrical conduit electrically connecting the helical electromagnetic armature 222 to the electrical energy source 212 via the brush 218D. To that end, the negative rail 216 may extend parallel to the longitudinal axes of the stator 220 and helical electromagnetic armature 222 and the positive rail 214.

The brushes 218A-D electrically connect the positive rail 214, stator 220, helical electromagnetic armature 222, and negative rail 216 together while maintaining translatable freedom therebetween. Specifically, brush 218A is configured to slideably engage the positive rail 214. Brush 218B is configured to slideably engage helical coils of the stator 220. Brush 218C is connected to helical coils of the helical electromagnetic armature 222 and is configured to slideably engage helical coils of the stator 220. Brush 218D is connected to the helical coils of the helical electromagnetic armature 222 opposite brush 218C and is configured to slideably engage negative rail 216.

The stator 220 includes helical coils 224 and is stationary relative to the helical electromagnetic armature 222. The stator 220 may be longitudinally aligned with the guide rail 206 and encircles the helical electromagnetic armature 222. The stator 220 may also be encircled by at least a portion of the guide rail 206 for more compact construction. The stator 220 is electrically connected to the positive rail 214 via brushes 218A, B and to the helical electromagnetic armature 222 via brush 218C.

The helical electromagnetic armature 222 includes helical coils 226 and is configured to longitudinally translate relative to the stator 220. The helical electromagnetic armature 222 may be encircled by at least a portion of the stator 220 and at least a portion of the guide rail 206. The helical electromagnetic armature 222 is electrically connected to the stator 220 via brush 218C and to the negative rail 216 via brush 218D. The helical electromagnetic armature 222 may be configured to be reset to an initial position after the projectile propulsion device 200 has fired.

The above-described helical electromagnetic counter recoil mechanism 208 includes brush connections and a stator coil and armature coil configuration for channeling electricity through the stator 220 and the helical electromagnetic armature 222. In this case, the stator 220 and helical electromagnetic armature 222 may impart an electromagnetic force on each other. Other helical electromagnetic configurations may also be used. For example, the helical electromagnetic counter recoil mechanism 208 may be configured so that electricity is channeled only through the stator or only through the armature. Other configurations such as separate electrical circuits for the stator 220 and helical electromagnetic armature 222 may be used.

Use of the projectile propulsion device 200 will now be described in more detail. The projectile 300 may be loaded on the guide rail 206. The guide rail 206 may then be aimed at a target or in the initial desired trajectory of the projectile 300.

The projectile 300 may then be fired at or toward the target. Specifically, the firing mechanism 204 may engage the explosive charge 302. The explosive charge 302 may then detonate, thus propelling the projectile 300 in a first direction off a distal end of the guide rail 206. Due to rapid forward acceleration of the projectile 300, the projectile propulsion device 200 (or more specifically, the base 202 and guide rail 206) receives a reaction force realized in the form of recoil, which is minimized or eliminated by the helical electromagnetic counter recoil mechanism 208 as described below.

Specifically, the electrical energy source 212 may provide electrical energy in the form of electrical current to the stator 220 and helical electromagnetic armature 222 via a circuit path routed through the positive rail 214, brushes 218A-D, and negative rail 216. Current passing through the coils 224 of the stator 220 and the coils 226 of the helical electromagnetic armature 222 create an electromagnetic force that moves the helical electromagnetic armature 222 in a second direction opposite the first direction at substantially the same time the projectile 300 is propelled in the first direction. The projectile propulsion device 200 receives a reaction force from the helical electromagnetic armature 222. In this way, the reaction force from the helical electromagnetic armature 222 counters the reaction force or recoil imparted on the projectile propulsion device 200 by the projectile 300.

The helical electromagnetic counter recoil mechanism 208 may then be reset. This may be done manually or via an application of reverse current or a reset mechanism.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A projectile propulsion device comprising:

a firing mechanism configured to actuate an explosive charge to initiate movement of the projectile in a first direction; a barrel forming a bore, the barrel being configured to guide the projectile in the first direction; and a helical electromagnetic counter recoil mechanism including:

a pulse-forming network (PFN) configured to provide electrical energy when the firing mechanism initiates movement of the projectile;

a stator electrically connected to the PFN, the stator being configured to generate a first electromagnetic field via the electrical energy; and a helical electromagnetic armature configured to move in a second direction opposite the first direction via the electromagnetic force when the firing mechanism initiates movement of the projectile in the first direction to minimize recoil of the projectile propulsion device, the helical electromagnetic armature having a center of mass configured to be aligned with a center of mass of the projectile in the first direction and the second direction so the projectile and helical electromagnetic armature do not impart rotation on the projectile propulsion device, the projectile propulsion device being configured for projectiles of a predetermined mass, the helical electromagnetic armature having a mass larger than the predetermined mass to minimize a travel velocity and a travel distance of the helical electromagnetic armature.

2. The projectile propulsion device of claim 1, the helical electromagnetic armature being configured to be reset after the projectile has been propelled from the projectile propulsion device.

3. The projectile propulsion device of claim 1, the helical electromagnetic armature being external relative to the barrel.

4. The projectile propulsion device of claim 1, the PFN being configured to discharge some of the electrical energy to the helical electromagnetic armature, the helical electromagnetic armature being configured to impart an electromagnetic force on the stator.

5. An artillery configured to propel an explosively charged projectile, the artillery comprising:

a firing mechanism configured to initiate movement of the explosively charged projectile in a first direction toward a target;

a barrel forming a bore, the barrel being configured to guide the explosively charged projectile in the first direction toward the target via the bore; and a helical electromagnetic counter recoil mechanism including:

a pulse-forming network (PFN) configured to provide electrical energy when the firing mechanism initiates movement of the explosively charged projectile;

a stator electrically connected to the PFN, the stator being configured to generate an electromagnetic force via the electrical energy; and a helical electromagnetic armature configured to move in a second direction opposite the first direction via the electromagnetic force when the firing mechanism initiates movement of the explosively charged projectile in the first direction to minimize recoil of the artillery, the helical electromagnetic armature having a center of mass configured to be aligned with a center of mass of the explosively charged projectile in the first direction and the second direction so the explosively charged projectile and helical electromagnetic armature do not impart rotation on the artillery, the artillery being configured for explosively charged projectiles of a predetermined mass, the helical electromagnetic armature having a mass larger than the predetermined mass to minimize a travel velocity and a travel distance of the helical electromagnetic armature.

6. The artillery of claim 5, the helical electromagnetic armature being configured to be reset after the explosively charged projectile has been propelled from the artillery.

7. The artillery of claim 5, the capacitor being configured to discharge some of the electrical energy to the helical electromagnetic armature, the helical electromagnetic armature being configured to impart an electromagnetic force against the stator.

8. The artillery of claim 5, the artillery being selected from the group consisting of a tank gun, an airplane gun, and a battleship gun.

* * * * *